US008423422B2

(12) United States Patent
Jain

(10) Patent No.: US 8,423,422 B2
(45) Date of Patent: Apr. 16, 2013

(54) MULTIPARTY COMPUTER-ASSISTED HAGGLING

(75) Inventor: Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/174,629

(22) Filed: Jun. 30, 2011

(65) Prior Publication Data
US 2011/0264548 A1 Oct. 27, 2011

Related U.S. Application Data

(63) Continuation of application No. 11/533,527, filed on Sep. 20, 2006, now Pat. No. 7,991,645.

(51) Int. Cl.
G06Q 30/00 (2006.01)
(52) U.S. Cl.
USPC ..................................... 705/26.1; 705/26.4
(58) Field of Classification Search .................. 705/26.1, 705/26.4, 26.41
See application file for complete search history.

(56) References Cited

U.S. PATENT DOCUMENTS

| | | | |
|---|---|---|---|
| 6,141,653 A | 10/2000 | Conklin et al. | |
| 6,401,080 B1 | 6/2002 | Bigus et al. | |
| 6,415,270 B1 * | 7/2002 | Rackson et al. | 705/36 R |
| 6,704,716 B1 | 3/2004 | Force | |
| 6,920,429 B1 | 7/2005 | Barni et al. | |
| 7,047,227 B2 | 5/2006 | Batachia et al. | |
| 7,251,628 B1 | 7/2007 | Edlund et al. | |
| 7,269,571 B2 | 9/2007 | Kar | |
| 2002/0016758 A1 | 2/2002 | Grigsby | |
| 2002/0069134 A1 | 6/2002 | Solomon | |
| 2002/0103740 A1 | 8/2002 | Maroney | |
| 2003/0055779 A1 | 3/2003 | Wolf | |
| 2003/0074277 A1 | 4/2003 | Foutz | |
| 2004/0039677 A1 | 2/2004 | Mura et al. | |
| 2004/0128224 A1 | 7/2004 | Dabney et al. | |
| 2004/0143540 A1 | 7/2004 | Song | |
| 2004/0254853 A1 | 12/2004 | Heene et al. | |
| 2005/0209931 A1 | 9/2005 | Jiang | |
| 2005/0228736 A1 | 10/2005 | Norman et al. | |

(Continued)

FOREIGN PATENT DOCUMENTS
KR 2001-0059291 11/2001

OTHER PUBLICATIONS

Anonymous, "Gotradeseafood.com Announces Launch of Comprehensive Online Seafood Exchange; Online Seafood Marketplace Established by Industry Leader," Business Wire, Feb. 28, 2000.*

(Continued)

Primary Examiner — Amee A Shah
(74) Attorney, Agent, or Firm — Lee & Hayes, PLLC

(57) ABSTRACT

The claimed subject matter relates to a computer-implemented architecture that can facilitate computer-assisted haggling and/or negotiation between multiple parties simultaneously. For example, various proxies associated with both buyers and sellers can be configured to negotiate with other proxies to buy or sell an item. The negotiations can be required to be progressive and during the negotiations a buyer or seller is, typically, allowed to withdraw his or her proposals. The architecture can include a registration component that can resolve concurrency and facilitate a registration of an agreement between two of the parties. The registration of an agreement can create a binding obligation between the parties after which other outstanding proposals can be terminated.

20 Claims, 14 Drawing Sheets

U.S. PATENT DOCUMENTS

2005/0228757 A1 10/2005 Sun et al.
2005/0234798 A1 10/2005 Du Preez et al.
2006/0149653 A1 7/2006 Davis et al.
2008/0071692 A1 3/2008 Jain

OTHER PUBLICATIONS

"Gotradeseafood.com Announces Launch of Comprehensive Online Seafood Exchange; Online Seafood Marketplace Established by Industry Leader"; Business Wire, Feb. 28, 2000, pp. 1-pp. 2.
International Search Report dated and mailed Dec. 24, 2007 for PCTIUS20071075869, 7 pages.
Michael, et al., "The Montreal Taxonomy for Electronic Negotiations," (2003) Proceedings of the 36th Hawaii International Conference on System Sciences, 34 pages.
Rebstock, et al., "Interactive Multi-Attribute Electronic Negotiations in the Supply Chain:Design Issues and an Application Prototype," (2002) Kluwer Academic Publishers, 11 pages.
Strobel. "Interactive Multi-Attribute Electronic Negotiations in the Supply Chain: Design Issues and an Application Prototype" (2003) IEEE, 10 pages.

* cited by examiner

MULTIPARTY COMPUTER-ASSISTED HAGGLING

PRIORITY APPLICATIONS

This application is a continuation of and claims priority from U.S. patent application Ser. No. 11/533,527, titled "Multi-Party Computer-Assisted Haggling", filed on Sep. 20, 2006, which is herein incorporated by reference.

BACKGROUND OF THE INVENTION

With the meteoric growth of the Internet in recent years, there has been an associated rise in many if not all current aspects as well as development of many new uses for this ubiquitous communication tool. One such area that has witnessed substantial growth over the years is the field of e-commerce. Businesses as well individuals are constantly creating new ways to buy and sell products and/or services over the Internet as well as new ways to implement their ideas. Broadly, most conventional solutions fall into at least one of three categories: Business-to-Business (B2B), Business-to-Consumer (B2C), and most recently, Consumer-to-Consumer (C2C).

In the C2C area, there are many commercial platforms available intended to provide an online marketplace for the buying and selling of goods. Some websites offer a centralized location for marketing and searching for items, while others include mechanisms to aid in the buying and selling. One such mechanism that is widely popular is the "auction" mechanism. Conventional auction systems (e.g., auction web pages, websites . . . ), however, place a lot of obligation on their buyers and a high level of insecurity on their sellers.

For example, in a conventional online auction marketplace a buyer has a concrete obligation to buy any item (e.g., a car) for which she is the winning bidder. Therefore, the prudent buyer will only bid on one car at a time, even though she might be interested many cars currently for sale on the online forum. In the very least, she may prefer to be the leading bidder for only one car, even though she may have other bids for other cars outstanding. Thus, those other bids, by necessity of her obligation to buy winning bids, will not be very meaningful, or even if they are, she is exposed to the risk that she will win both (or all) cars, even though she only wants (and more particularly can only afford) a single car. Moreover, in order to fairly run the online auction, buyers generally are not allowed (or at least discouraged) to withdraw their bids once made. Otherwise, sellers would not be interested in listing their items on that auction. Due to these and other difficulties, an online auction is not conducive to negotiating deals with more than one party at a time.

In addition, conventional online auction forums create an environment in which there is a lot of insecurity for the sellers. For example, a seller of an item (e.g., a car) wants, ideally, to sell his car at the maximum possible price such as a desirable or "dream" price. However, the auction mechanism typically requires the seller to enter a reserve price corresponding to the lowest possible price the seller is willing to accept for the car. As with the buyer side, the seller also is generally forbidden (or at least discouraged) from withdrawing an offer for sale once it is posted. Thus, the seller must enter this reserve price for which he might be very insecure because his car could very well sell for that price no matter how much he hopes otherwise. However, if the seller makes the reserve price too high (e.g., at or near his dream price), the end result is that buyers will often not make any bids, undermining certain positive effects of the auction mechanism, and the seller may therefore have a much lower chance of selling the car.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The claimed subject matter disclosed and claimed herein, in one aspect thereof, comprises an architecture that can facilitate computer-assisted haggling and/or negotiation between multiple parties simultaneously. In accordance therewith, the architecture can be employed to configure one or more buyer proxies to negotiation purchases of an item at a respective desirable seller price. In addition, one or more sell proxies can be configured to negotiate sales of an item at respective desirable sell prices. Typically, the buyer proxies communicate only with seller proxies and vice versa. For example, the various proxies can negotiate by way of proposals transmitted between them.

Generally, the desirable prices can be adjusted (typically by way of the negotiation mechanisms described herein), and any such adjustment can be maintained as an open offer/proposal. Moreover, in most cases, a buyer or seller associated with one of the proxies can withdraw or accept any open proposal at any time. When one of the proxies receives a proposal at a price greater than or equal to the desirable price (or alternatively the buyer/seller associated with the proxy accepts an open proposal from another proxy), a registration request can be sent to a platform owner. If the registration request is successful, a valid registration occurs and the transaction can become binding to create contractual obligations for both parties associated with the proxies that negotiated the successful registration. However, in most cases, up until a registration occurs, even if a proxy accepts a proposal from another proxy, the transaction is not binding and, additionally, either party to the transaction may be able to withdraw the proposal.

To the accomplishment of the forgoing, the architecture can also include a registration component that can effectuate the registration as well as resolve any potential concurrency that might arise. For example, the registration component can maintain and/or access a bipartite graph in order to resolve concurrency. The bipartite graph can be separated into two disjoint sets, one applying to a seller side of a proposal for an item and the other applying to the buyer side. The registration component can, e.g., examine the vertices to ensure that no edge is present. If an edge is present, then the registration request cannot be registered. If, however, an edge is not associated with either vertex in question, then an edge can be created and the transaction officially registered.

In accordance with one aspect of the claimed subject matter, for example, in connection with platforms that run multiple processors in order to manage the negotiations, semaphores can be employed to aid in resolving concurrency. For example, the registration component can employ a semaphore to lock resources (e.g., the resources corresponding to the two vertices in question during a registration request) associated with the bipartite graph during the registration process.

In accordance with another aspect of the claimed subject matter, the negotiations (e.g., proposals such as offers and counteroffers) between the various proxies can be required to be progressive. For example, if a price provided in a proposal does not exceed a progressive price percentage (PPP), then the proposal may be rejected. The PPP can be fixed or be a dynamic value such as, e.g., 25%. The PPP can be determined based upon a price gap between a desirable sell price and a desirable buy price.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DESCRIPTION OF THE INVENTION

Figure 1:
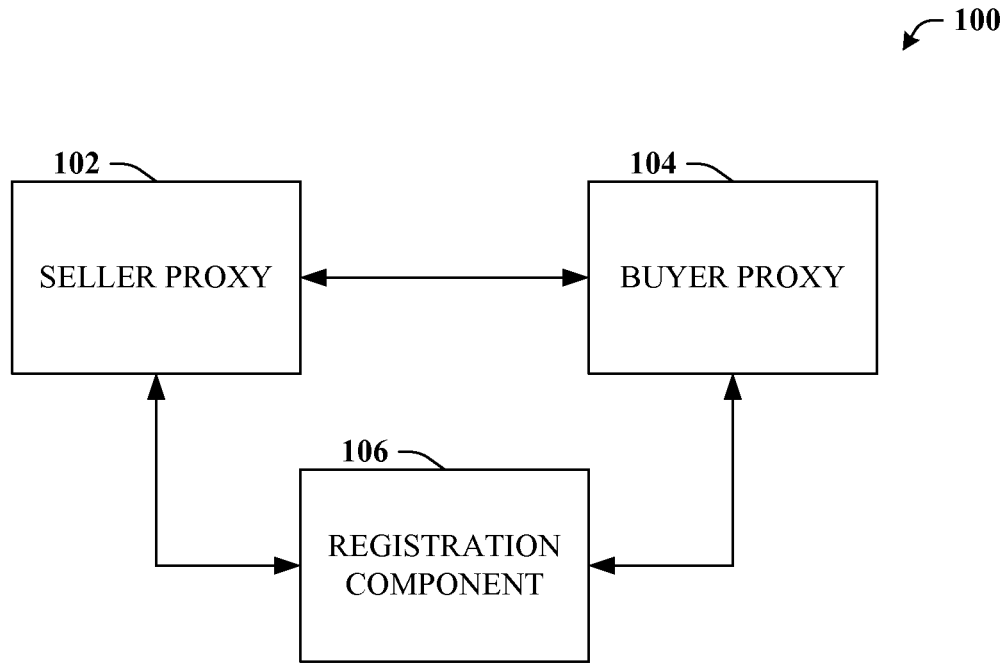
FIG. 1 is a block diagram of a computer-implemented system that facilitates multiple party haggling in an online market environment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As used herein, the word "concurrency" can be defined generally as a property of systems that consist of computations that execute overlapped in time, and which may permit the sharing of common resources between those overlapped computations. More specifically, concurrency can be defined as a manner for ensuring that an item for sale is sold at most once and/or that a buyer interested in purchasing the item (and/or other similar items) purchases at most one item. For example, a seller might make an offer to sell an item to a plurality of buyers, any one of which might at any time accept the offer. Likewise, a buyer interested in a single item might make a plurality of offers, each for the purchase of an item, wherein each offer potentially is extended to a different seller, any one of which might at any time accept the offer.

Hence, the terms "accept", "acceptance", and "accepted", as used herein need not necessarily imply a binding agreement has been formed. Rather, an accepted offer/proposal might only become binding once a registration occurs. Accordingly, concurrency is not necessarily directed toward ensuring that only one offer/proposal is accepted, but rather toward ensuring that at most one offer/proposal for a purchase/sale of an item is registered. It is to be appreciated that a binding agreement can mean that the buyer is contractually obligated to buy the item and/or the seller is contractually obligated to sell the item. It is to be further appreciated that an accepted offer/proposal, while not necessarily a binding agreement, can create a contractual obligation to make a good faith effort to perform a registration.

As used herein, the term "progressive", when used in connection with proposals such as offers and/or counteroffers, can be defined as a manner for ensuring that a price provided in the proposal is meaningful. For example, during negotiation for the sale of an item, there can exist a price gap (e.g., the difference between what the seller is asking for the item and what a buyer is bidding for the item). A counteroffer might only be meaningful and therefore progressive if a certain percentage of the price gap is met and/or surpassed by the price included in the counteroffer.

As used herein, the term "nonprofessional" can be applied to buyers and/or sellers. Generally, a nonprofessional is a buyer or seller of an item who does not engage in transactions for the purchase and/or sale of the item in the ordinary course of business. Accordingly, if the item is a car and the seller is a professional real estate broker, then the seller might still qualify as a nonprofessional since real estate brokers do not normally engage in transactions for cars in the ordinary course of business. However, if the seller were instead a car dealer, then she might not be a nonprofessional in connection with a transaction for a car.

Referring initially to FIG. 1, a computer-implemented system 100 that can facilitate multiple party haggling in an online market environment is illustrated. Generally, the system 100 can include a seller proxy 102 that can be configured to negotiate a sale, and a buyer proxy 104 that can be configured to negotiate a purchase. In accordance with one aspect of the claimed subject matter, the seller proxy 102 and/or the buyer proxy 104 can be associated with a respective seller/buyer (not shown). For example, the seller/buyer can create and configure a proxy (e.g., proxies 102-104) in order to facilitate negotiations. Accordingly, it is to be appreciated that in many situations, the seller/buyer can have access to any information available to his or her respective proxy 102-104 and vice versa. Therefore, in some situations, when referring to the proxies 102-104, the parties, e.g., the seller and/or buyer can be used substantially interchangeably and vice versa, yet in other situations certain distinctions are relevant as will be described infra.

The system 100 can also include a registration component 106 that can be configured to resolve concurrency, which will be discussed in more detail in connection with FIGS. 5-10. The registration component 106 can also be configured to facilitate a registration, also detailed more thoroughly with reference to FIGS. 5-10. The seller proxy 102 and the buyer proxy 104 can negotiate in a variety of ways which will be detailed herein. Ultimately, the negotiation between the seller proxy 102 and the buyer proxy 104 can end either unsuccessfully (e.g., neither party agrees to the terms of the other) or successfully (e.g., an agreement is reached). If the negotiation is successful, one of the proxies (usually the proxy that agreed to the terms of the other proxy) can automatically and immediately send a registration request to the registration component. For example, when the seller proxy 102 and the buyer proxy 104 agree to terms (e.g., price, quantity, etc.), at least one of the seller proxy 102 and the buyer proxy 104 can transmit a registration request to the registration component 106.

It is to be appreciated and understood that although the seller proxy 102 can accept an offer/proposal from the buyer proxy 104 (and vice versa); an acceptance does not necessarily create any binding obligations for either party. In particular, successful negotiations between the proxies 102-104 might first require the registration component 106 to register the accepted proposal before the agreement included in the proposal becomes binding. In accordance therewith, once a proposal is registered, the seller proxy 102 and/or the buyer proxy 104 can be terminated such that neither proxy attempts to continue negotiations with another proxy.

Moreover, in accordance with one aspect of the claimed subject matter, at least one of or both the seller proxy 102 and the buyer proxy 104 can be limited to associated sellers/buyers who are nonprofessionals. In accordance with another aspect, the proxies 102-104 can be configured to negotiate with non-proxy components. For example, the buyer proxy 104 can be equipped with (or operatively coupled to) an agent (not shown) that manages nonstandard types of negotiations with third parties. The agent could be, e.g., a web crawler (also known as spiders, bots, etc.) that searches for an item of interest and alerts the buyer of anything considered to be relevant. The agent might also be configured to transmit a nonstandard type of communication to the third party such as an email with, e.g., further contact information relating to the buyer, desired terms, solicitation to create a sell proxy 102, and the like.

Figure 2:
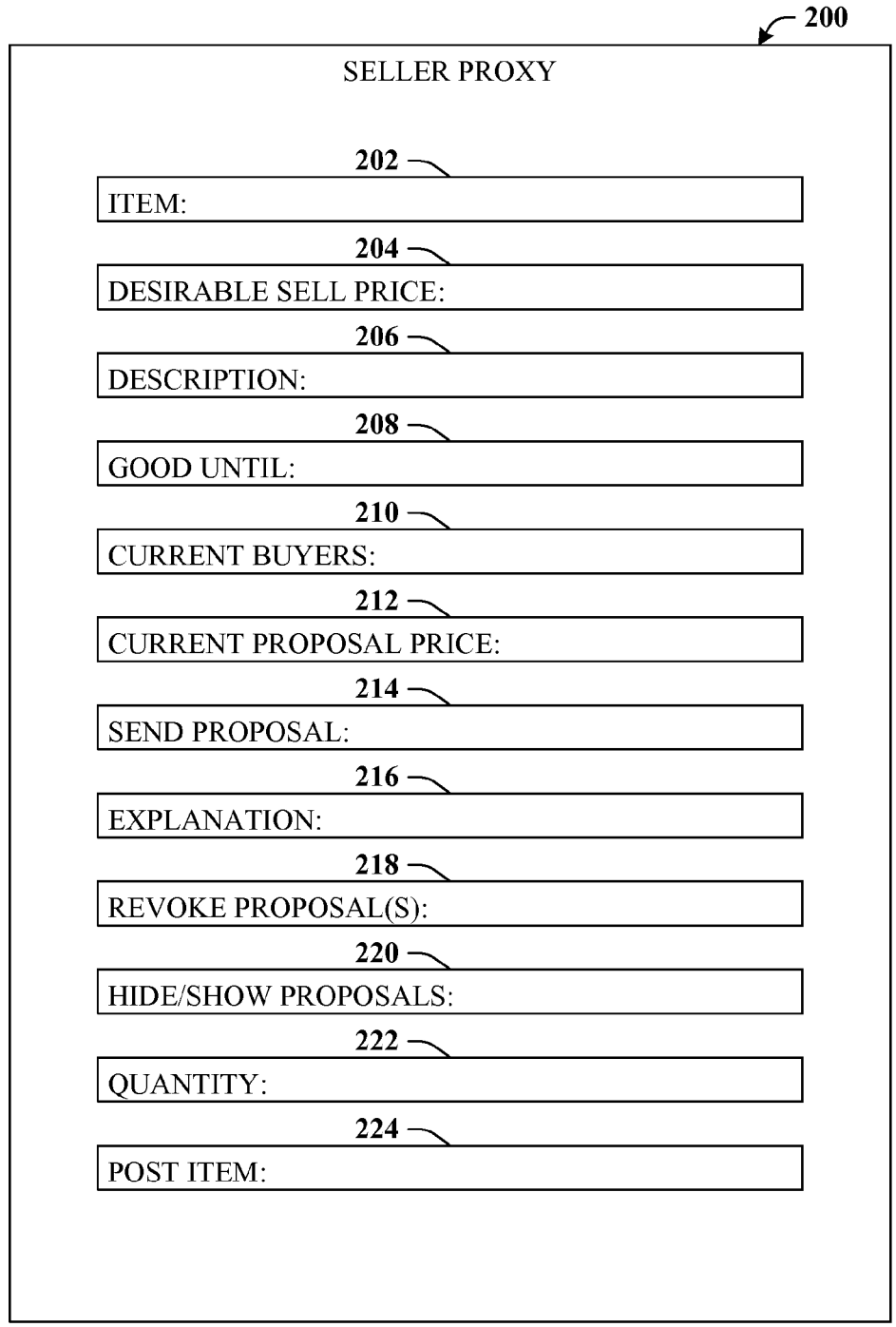
FIG. 2 is an exemplary computer-implemented seller proxy.

While still referring to FIG. 1, but turning to FIG. 2 as well, an exemplary seller proxy 200 is depicted. The seller proxy 102 can be substantially similar to seller proxy 200 either of which can be, for example, an interactive webpage, an application, an applet, a graphical user-interface (GUI), etc., configurable to promote a sale of an item 202 at a desirable sell price 204. The desirable sell price 204 can be thought of as a "dream price" for the item 202. That is, unlike conventional mechanisms, such as an auction that typically require a user to enter a lowest price (e.g., a reserve price); the desirable sell price 204 can be higher than the lowest price that a seller is willing to sell the item 202. Since the seller proxy 200 can be configured to negotiate inter alia prices, the desirable sell price 204 can change, e.g., during the course of negotiations. That is, unlike conventional auction systems that employ a buy-it-now feature, the desirable sell price 204 can be readily negotiated by a seller and/or the seller proxy 200.

The seller proxy 200 can also include numerous other configurable features including but not limited to features 206-224, which will be described infra. It is to be appreciated that many or all of the features 202-224 can be optional; however, in some cases some features (e.g., desirable sell price 204, item 202 . . . ) may be required to exist. It is also to be appreciated that features 202-224 (as well as any others such as images of the item 202, shipping information, terms and conditions, etc.) can be configured by a seller in various forms. For example, features 202-224 can be a text box, a button, a dialog box, a radio button, a menu, a form, a link to other data and the like.

In more detail, the seller proxy 200 can include a description 206 that can provide further information about the item 202 to a potential buyer. The good until 208 feature can be employed to limit a time period for negotiation. For example, the seller may want to make proposal for the item 202 available for only a certain period of time. Therefore, in that case, the desirable sell price 204 (or some other feature) may only apply up to the good until 208 time.

Additionally, the seller proxy 200 can be configured to display the current buyers 210 with whom the seller proxy 200 is negotiating. Current buyers 210 can be, e.g., potential buyers (and/or the buyer proxies associated therewith) who have submitted proposals/offers for the item 202, but, e.g., at a current proposal price 212 that is below the desirable sell price 204. The seller can view and sort the current buyers 210 (with associated current proposal price 212) in any way desired, and can also instruct the seller proxy 200 to accept a particular proposal from one of the current buyers 210 or send a counteroffer to one or more of the current buyers 210 by way of the send proposal 214 feature. As with the desirable sell price 204, the send proposal 214 feature can be associated with the good until 208 feature. For instance, a counteroffer can be configured to be valid for only a certain period of time, after which it can expire automatically.

Any such counteroffer (e.g., sent by way of the send proposal 214 feature) can be accompanied by an explanation 216 that, e.g., explains why the current proposal price 212 is inadequate and/or why the desirable sell price 204 is appropriate. In certain cases, such as when progressive pricing is used (described infra), the send proposal 214 feature can require that the desirable sell price 204 be reduced an appropriate amount. Any reduction/change in the desirable sell price 204 can be global (e.g., applies to all negotiations in which the seller proxy 200 is engaged) or applicable to only one or some of the proposals being negotiated.

In accordance with one aspect of the claimed subject matter, the seller proxy 200 can be thought of as a mechanism that provides an open offer (proposal) for the item 202 at the desirable sell price 204, which can be accepted at any time by the buyer proxy 104 and/or further negotiated by either proxy 102-104. Once accepted, a registration request can be sent to the registration component 106 and, upon successful registration, a binding transaction complete with contractual obligations on both sides can be effectuated. However, up until the time of successful registration, any proposal (e.g., one at the desirable sell price 204 or another price such as one submitted by way of the send proposal 214 feature) can be terminated and/or withdrawn.

For instance, the proposal can terminate automatically such as when the good until 208 feature indicates a lapse or expiration, or alternatively, the proposal can be withdrawn at any time by way of the revoke proposal(s) 218 feature. The revoke proposal(s) 218 feature can be employed to revoke all proposals (e.g., terminate the seller proxy 200), revoke all counteroffers (e.g., all proposals with a price lower than the desirable price), or only one or certain ones of the proposals. As described, upon registration, both parties to the transaction (e.g., the seller proxy 102 and the buyer proxy 104) can be terminated immediately, however, there exists the possibility that after a successful registration but prior to such termination of the proxies 102-104, the seller proxy 102 (or 200) attempts to revoke proposal(s) 218. Since registration can create a binding agreement, any such attempts to revoke proposal(s) 218 afterwards are typically ineffective, even though the revoke proposal(s) 218 can successfully revoke any proposals at any time prior to registration and/or the termination of the seller proxy 200.

The seller proxy 200 can further be equipped with a hide/show proposals 220 feature. The hide/show proposals 220 feature can be employed to configure whether (and/or which) other participants (e.g., buyers and sellers) can see the proposals submitted by the buyer proxy 104. Typically, when the hide/show proposals 220 is set to "show", then all participants can see proposals received from the buyer proxy 104. In contrast, the default when the hide/show proposals 220 is set to "hide" is to forbid anyone but the buyer associated with the buyer proxy 104 (that submits the proposal) from inspecting the proposal. However, in accordance with one aspect, the hide/show proposals 220 can be further configured to distinguish between all participants, buyers versus sellers, and all buyers versus current buyers 212 (e.g., buyers that have sent a proposal/counteroffer).

For example, the seller may allow current buyers 212 to see the proposals from all other current buyers 212, but not allow anyone else to see them. In some cases the seller might want to allow sellers to view the proposals from buyers, but in most cases will not. Furthermore, in certain situations, the seller may allow only a particular buyer to view others' proposals, while in certain other situations, the seller may desire for proposals to be visible for only a certain period of time and hidden thereafter (which can be achieved, e.g., by way of the good until 208 feature). To the accomplishment of the foregoing, the hide/show proposals 220 can be configured to implement any or all of the aforementioned hide/show proposals 220 permutations in accordance with the desires of the seller.

In addition, the seller proxy 200 can also include a selection for quantity 222. Generally, the default for quantity 222 is set to "1", however, a higher quantity 222 can be input as well. Finally, seller proxy 200 can also include a post item 224 feature as well as numerous other features. It is, of course, impossible to describe every possible feature that could be included in the seller proxy, however, it is to be appreciated that many other such features are contemplated and others could be implemented without departing from the spirit and scope of the subject claims appended hereto. The post item 224 feature can be employed to, e.g., submit the sell proxy 200 upon completion of initial configuration (e.g., configuration of some or all of features 202-222).

Figure 3:
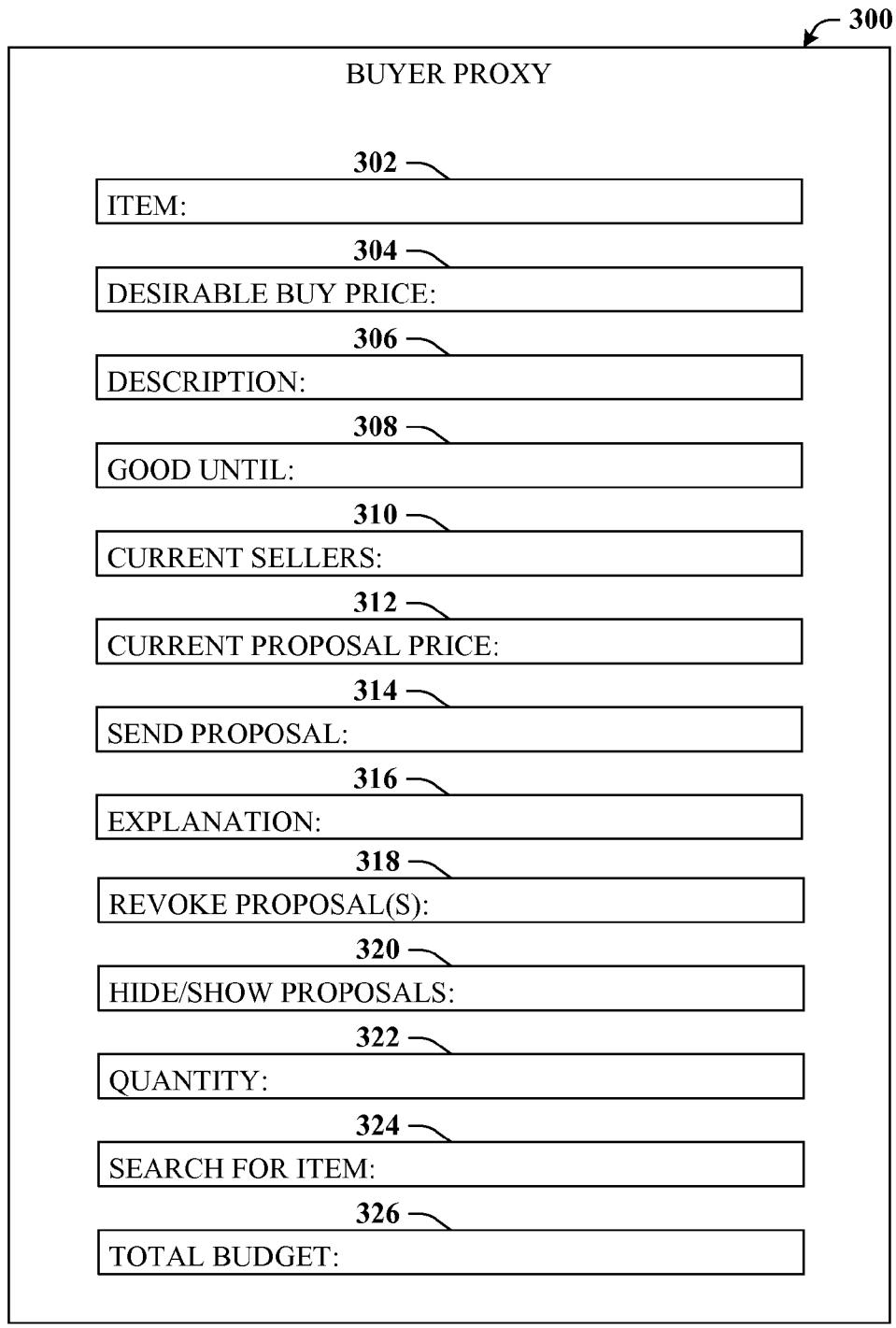
FIG. 3 illustrates an exemplary computer-implemented buyer proxy.

Turning now to FIG. 3, while still referring to FIGS. 1-2, an exemplary buyer proxy 300 can be found. Generally, the buyer proxy 300 is substantially similar to the seller proxy 200, but with features 302-324 specific to a buyer's needs rather than to a seller's needs. Accordingly, the detailed description provided supra in connection to the features 202-224 of the seller proxy 200 can be applicable for all or most of the like features 302-324 of the buyer proxy 300 and is hereby incorporated. One of ordinary skill in the art will readily appreciate how the indicated explanations provided with seller proxy 200 extend naturally to the buyer proxy 300. For example, description 206 can allow a seller to provide further information about the item 202 to a potential buyer. This explanation can be naturally extended to pertain to description 306 as a feature that can allow the buyer to provide additional information about the buyer, uses, needs, requirements for the item 302 and the like. However, for additional clarity of explanation various other aspects of the buyer proxy 300 can now be described.

The desirable buy price 304 can be a buyer's dream price for the item 302. Both types of proxies (e.g., the seller proxy 200 and the buyer proxy 300) can effectively negotiate by maintaining open offers/proposals at desirable prices (e.g., the desirable sell price 204 and the desirable buy price 304). Therefore, typically, the desirable buy price 304 will be the current proposal price 212 and, similarly, the desirable sell price 204 will generally equal the current proposal price 312. Accordingly, whereas traditional auction systems begin with a seller providing a minimum price he will accept for the item and/or require a buyer to specify a maximum price she is willing to pay for the item, the claimed subject can allow both sides to specify an ideal price (e.g., desirable prices 204/304), and potentially negotiate toward an acceptable convergence. As such, much of the undesirability and insecurity associated with traditional auction systems can be mitigated.

Since the buyer proxy 300 is not interested in selling the item 302, it will not typically have an option to post item (e.g., post item 224). Rather, the buyer proxy can be furnished with a search for item 324 feature. The search for item 324 feature can be employed to create a shortlist of seller proxies (e.g., seller proxy 200) selling an item or items, all of which are substantially similar to the item 302. The buyer can remove any of the short listed seller proxies at any time, or might add more seller proxies by utilizing the search for item 324 feature again at a later time such as when more items (and their associated seller proxies) come into the market. In addition, the buyer proxy 300 can receive notifications of newly created proxies that are potentially suitable to match the criteria of the buyer proxy 300. These notifications can be delivered, e.g., by a platform owner (not shown).

In addition, the buyer proxy 300 can include a total budget feature 326, in which the total aggregate amount for all purchases of the item 302 can be specified. For example, the total budget feature 326 can be configured to buy more than one item 302, but limited by aggregate price (e.g., total budget 326) rather than by quantity 322. It is to be appreciated that total budget 326 can be used in conjunction with quantity 322, in various ways. For instance, if total budget 326 is configured to be, e.g., $1,000 and quantity 322 is configured to be, e.g., 10, then the buyer proxy 300 can be set to negotiate for 10 items 302 for or spend $1,000, whichever comes first. In accordance with one aspect, the buyer proxy 300 can be configured to buy at least 10 items, but possibly more up to $1,000.

Figure 4:
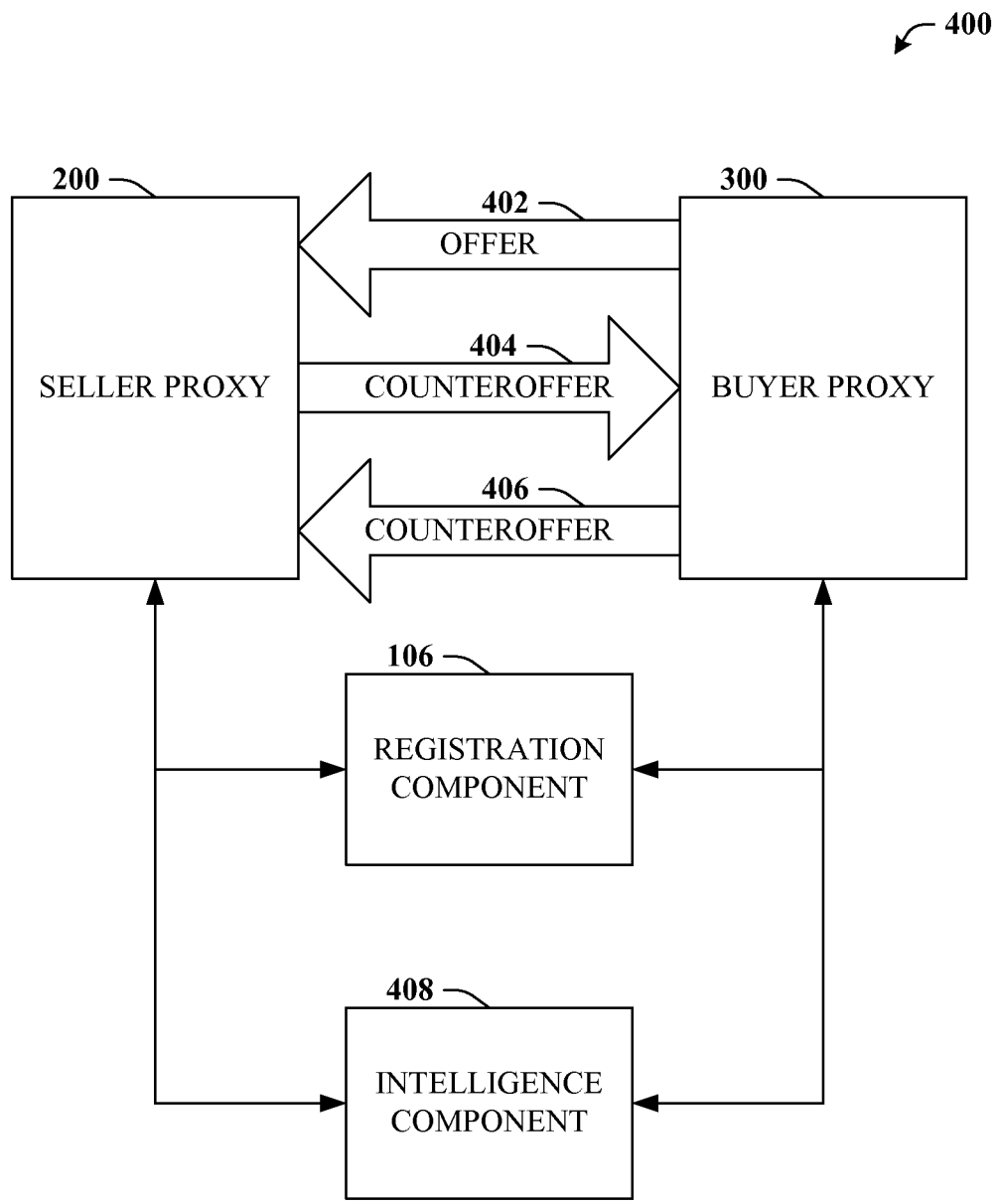
FIG. 4 illustrates a system that can facilitate negotiations by way of proposals.

With reference now to FIG. 4, a system 400 that can facilitate negotiations by way of proposals is depicted. Generally, the system 400 can include a seller proxy 200 that can be configured to negotiate a sale of an item 202 for a seller at a desirable price 204. In addition, a buyer proxy 300 can be included that can be configured to negotiate a purchase of an item 302 for a buyer at a desirable buy price 304. The system 400 can include a plurality of proposals 402-406 that can be thought of as either an offer (e.g., offer 402) or a counteroffer (e.g., counteroffers 404-406). The proposals 402-406 can be employed to assist in the negotiations between the seller proxy 200 and the buyer proxy 300. While only three such proposals are illustrated, it is to be appreciated that virtually any number of proposals might exist.

Typically, a seller can create and configure the seller proxy 200 by employing features 202-222, then post the item for sale by way of the post item 224 feature. Analogously, a buyer can create and configure the buyer proxy 300 by way of the features 302-322, then search (e.g., search for item 324) for seller proxies with suitably matching criteria. Since both proxies 200, 300 can allow their respective seller/buyer to enter a dream price (e.g., desirable prices 204, 304), both parties can be more confident of obtaining a better deal. Moreover, any subsequent negotiations can also be more consequential.

For example, once configured the sell proxy 200 can maintain an open offer for the item 202 at the desirable sell price 204 to any interested buyer/buyer proxy 300. If the desirable sell price 204 is acceptable to the buyer she can manually accept it and a registration request can be transmitted to the registration component 106. In accordance with one aspect of the claimed subject matter, the buyer proxy 300 can automatically accept the desirable sell price 204 and submit a registration request to the registration component 106. The latter could occur, e.g., when the desirable buy price 304 is greater than or equal to the desirable sell price 204. If the desirable sell price 204 is not accepted by buyer, then whatever price she entered for the desirable buy price 304 can be communicated to the seller proxy 200 as an open offer 402.

Accordingly, both proxies 200, 300 can be maintaining an open offer at desirable prices 204, 304, while simultaneously being exposed to open offers from other proxies at current proposal prices 212, 312. At any time prior to registration a seller/buyer might withdraw an offer by revoking proposal(s) 218 or 318, or accept one of the open offers. Moreover, the seller can respond to offer 402 with a counteroffer 404. Similarly, the buyer can respond to the counteroffer 404 (or the original open offer at the desirable sell price 204) with counteroffer 406. As described, each of the counteroffers 404 or 406 (depending upon the originator of the counteroffer) can be accompanied by an explanation 216 or 316 elucidating why the desirable price 204 or 304 is more favorable than the current proposal price 212 or 312.

Appreciably, all proposals 402-406 are likely to be within a price gap that can be defined by the difference between the desirable sell price 204 and the desirable buy price 304. Accordingly, any subsequent proposals/counteroffers (e.g., counteroffers 404-406) are likely to converge toward an acceptable median at which both the buyer and the seller can agree. In accordance with one aspect of the claimed subject matter, the system 400 can also require this to be the case. For example, all proposals can be required to be progressive, such that any of the proposals 402-406 must close at least a fixed percentage (e.g., 25% or some other value) of the price gap. In such cases, when the buyer or seller attempts to submit a proposal 402-406 that is not progressive, the associated proxy (e.g., the seller proxy 200 or the buyer proxy 300) can refuse to transmit the proposal 402-406. However, it is to be appreciated that a change to a desirable price 204 or 304, while not progressive for one particular proxy might be progressive for others, and therefore acceptable for those others.

As an exemplary illustration intended to aid in understanding but not to limit the claimed subject matter, consider the following situation. A seller configures the seller proxy 200 to negotiate for the sale of a car (e.g., item 202) at a desirable price 204 of, say, $20,000. A buyer configures the buyer proxy 300 to buy a suitably matching car (e.g., item 302) at a desirable buy price 304 of $10,000. It is further assumed that the system 400 is employing progressive pricing set at 25% of the price gap. After an initial search (or some other means such as notification from the platform owner), the buyer sees the car offered at $20,000, and the seller can see the buyer's offer 402 at $10,000. It should be noted that the offer 402 from the buyer proxy 300 can be an initial offer, and thus, for the purposes of ensuring all proposals 402-406 are progressive, it can be assumed that the price gap is the desirable sell price 204 or the full $20,000 (e.g., the current proposal price 212 is $0). Hence, had the buyer configured the desirable buy price 304 to be below $5,000, (e.g., less than 25% of $20,000) the progressive mechanism could reject the offer 402 in connection with the seller proxy 200 (but, as previously detailed, allow a valid offer 402 for $5,000 for other seller proxies in which progressive pricing is satisfied).

If neither side agrees to the terms (e.g., price) of the other side, further negotiations can be accomplished by way of additional proposals/counteroffers 404-406. For example, in this case the price gap is now $10,000 (e.g., $20,000−$10,000=$10,000), so any counteroffer 404-406 by one of the proxies 200, 300 must close this price gap by at least 25% (e.g., $2,500), or it can be ignored. Unlike conventional auction systems, where a buyer could in this situation make a counteroffer 406 for $10,001, which the seller is likely to consider not very meaningful, the claimed subject matter could require the counteroffer 406 to be at least for $12,500, which the seller is likely to consider much more meaningful.

As can be seen, the price gap is now only $7,500 (e.g., $20,000−$12,500=$7,500), and either party is free to accept the price of the other, withdraw the price or submit a new progressive counteroffer with an optional explanation 216 or 316. That is, the buyer proxy 300 could submit another counteroffer 406 with a desirable buy price 304 (with the seller seeing it as the current proposal price 212) of at least $14,375. Additionally or alternatively, the seller proxy 200 could transmit counteroffer 404 with a desirable sell price 204 (with the buyer seeing it as the current proposal price 312) of no more than $18,125.

The negotiations between the seller proxy 200 and the buyer proxy 300 can continue in this fashion until an agreement (if any) is reached between the parties. In that case, one of the proxies 200, 300 can submit a registration request to the registration component 106. Upon successful registration, a binding agreement between the buyer and the seller can be formed. Additionally, all negotiations involving the seller proxy 200 and the buyer proxy 300 can be closed and the proxies can be terminated. It is to be appreciated, however, that if either proxy has a quantity (e.g., quantities 222 or 322) greater than one, the associated proxy need neither be terminated or negotiations closed. Rather, that particular proxy can remain active and the quantity feature can be reduced by one. Thus, in accordance with one aspect, the proxy 200 or 300 will not be terminated until the quantity 222 or 322 reaches zero, wherein the default is typically one.

It is also to be appreciated and understood that progressive pricing percentage (PPP) need not be set at 25%. Rather, this percentage is merely exemplary and other values are contemplated. In addition, this percentage can be fixed or dynamically adjusted based upon a variety of factors such as the type of the item 202 or 302, the time of day, a server load, a number of proxies with open negotiations, demographic information, empirical data, etc. For example, an intelligence component 408 can be employed to determine the fixed or dynamically adjusted PPP. In addition, the intelligence component 408 can also be employed to alert a buyer/seller when a particular proposal is not progressive for a certain proxy and provide, e.g., pricing information suggestions that will satisfy the other proxy. In accordance with one aspect of the claimed subject matter, the intelligence component 408 can also determine when the platform owner should notify one the proxies 200, 300 of new proxies that come into the marketplace, e.g., by examining and comparing the various criteria to determine suitable matches.

For example, the intelligence component 408 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines...) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 5:
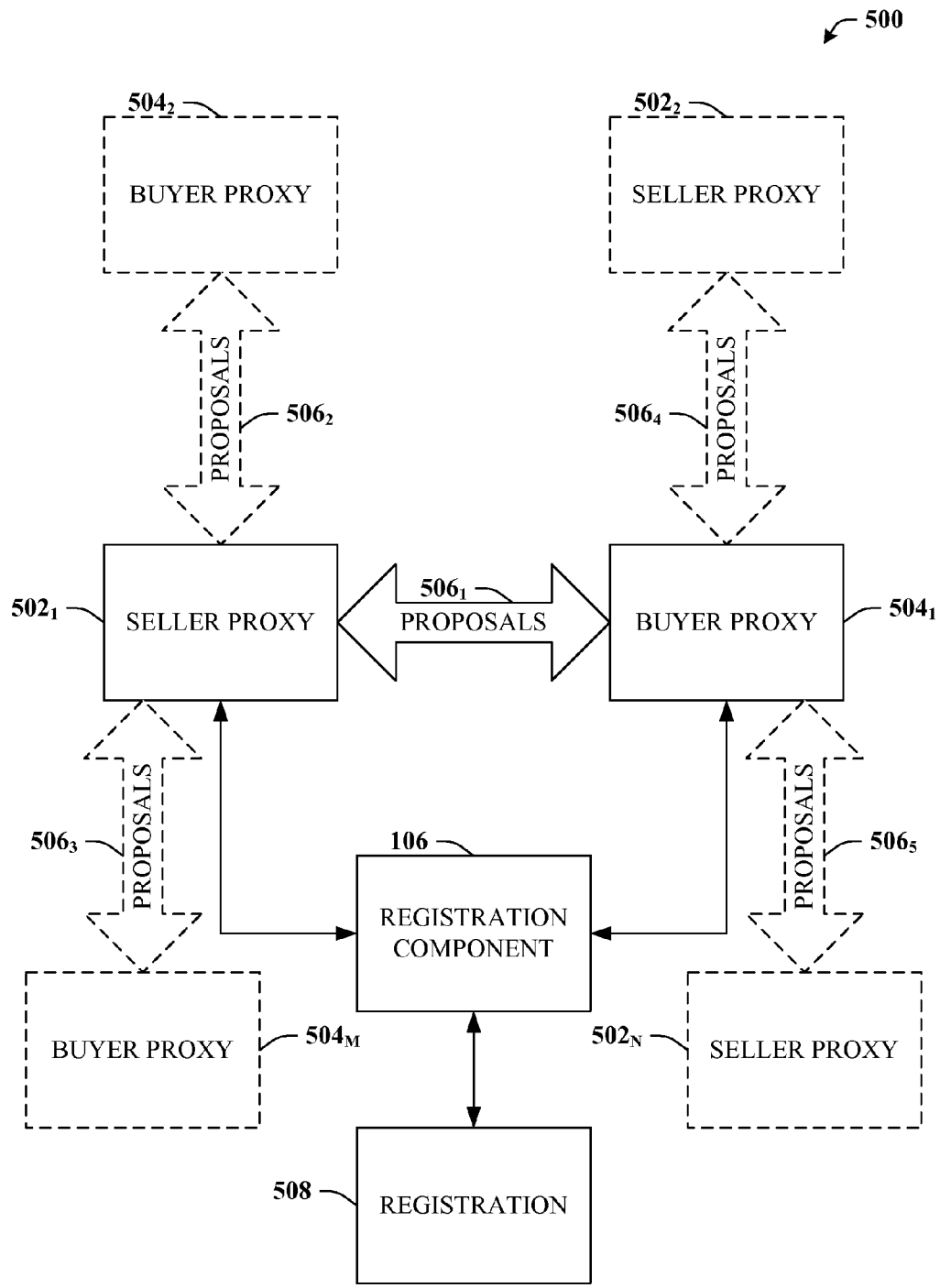
FIG. 5 depicts a block diagram of a computer-implemented system that that can resolve concurrency for simultaneous negotiation of proposals between multiple proxies.

Referencing FIG. 5, a system 500 that can resolve concurrency for simultaneous negotiations between multiple proxies is illustrated. The system 500 can generally include N seller proxies $502_1$-$502_N$, that can negotiate for a sale of an item with any of any number, M of buyer proxies $504_1$-$504_M$, where N and M are positive integers. It is to be appreciated that although each seller proxy $502_1$-$502_N$ (or each buyer proxy $504_1$-$504_M$) can have distinguishing features from other seller proxies $502_1$-$502_N$ (or other buyer proxies $504_1$-$504_M$), they can be referred to either collectively or individually as seller proxy 502 (or buyer proxy 504). The proxies 502-504 can negotiate by way of proposals $506_1$-$506_5$ (referred to herein collectively as proposals 506 and noting that a number N*M proposals 506 are possible even though only five are depicted). The proposals 506 can include one or more offers and/or counteroffers as described supra in connection with proposals 402-406 of FIG. 4.

The system 500 can also include the registration component 106 that can be configured to resolve concurrency and to facilitate a registration 508. The registration component 106 can resolve concurrency by ensuring that only one registration 508 occurs regardless of the negotiations of the proxies 502-504 and regardless of any number of proposals 506 that are accepted by one of the proxies 502-504. As indicated by the solid lines, the negotiations between seller proxy $502_1$ and buyer proxy $504_1$ by way of proposals $506_1$ concludes with a successful registration 508. Thus, the elements displayed in broken lines, even if acceptable to one of either the seller proxy $502_1$ and the buyer proxy $504_1$ (and even if actually accepted), will not have any bearing on the obligations of either the seller proxy $502_1$ and the buyer proxy $504_1$ with respect to the item sold. That is, the transaction facilitated by proposals $506_1$ can be binding, but no other potential transactions will be binding.

By way of illustration, and returning to the previous example in which the item to be sold is a car, assume that the seller proxy $502_1$ has a desirable price of $18,000, and the buyer proxy $504_1$ has a desirable price of $16,000. As can be seen, buyer proxies $504_2$ through $504_M$ can be actively and simultaneously competing with buyer proxy $504_1$ for the purchase of the car from seller proxy $502_1$. Similarly, buyer proxy $504_1$ can also be negotiating actively and simultaneously for cars offered by seller proxies $502_2$-$502_N$. Although not depicted, it is to be appreciated that seller proxies $502_2$-$502_N$ could also be actively and simultaneously negotiating with buyer proxies $504_2$ through $504_M$ as well. Accordingly, if one such proposal between, say, seller proxy $502_2$ and buyer proxy $504_M$ is accepted and a successful registration 508 occurs, then seller proxy $502_2$ and buyer proxy $504_M$ will in most situations subsequently drop out of the current negotiations for the car(s) that are occurring with respect to the other proxies.

Now suppose that seller proxy $502_1$ lowers his desirable price to $17,000, which can affect the proposals $506_1$-$506_2$ (and $506_M$ if the buyer proxy $504_M$ is still negotiating). Substantially simultaneously buyer proxy $504_1$ raises her desirable price to $17,000. Buyer proxy $504_2$ does not raise her desirable price, but sees the new desirable sell price of $17,000 and agrees to it. Accordingly, buyer proxy $504_2$ can transmit a registration request to the registration component 106. Meanwhile, however (depending upon which proxy accepted the other's proposal), one of either the seller proxy $502_1$ and buyer proxy $504_1$ can also transmit a registration request to the registration component 106. Since at most only one of these requests can successfully create a registration 508, the registration component 106 must resolve concurrency, which can be described with reference to FIG. 6. It is to be appreciated that the proxies 504-506 might also be configured to take on additional autonomy from the associated seller/buyer. For example, the seller/buyer might grant his or her respective proxy 504-506 the authority to automatically accept proposals/counteroffers within a specified range without modifying a desirable buy/sell price.

Figure 6:
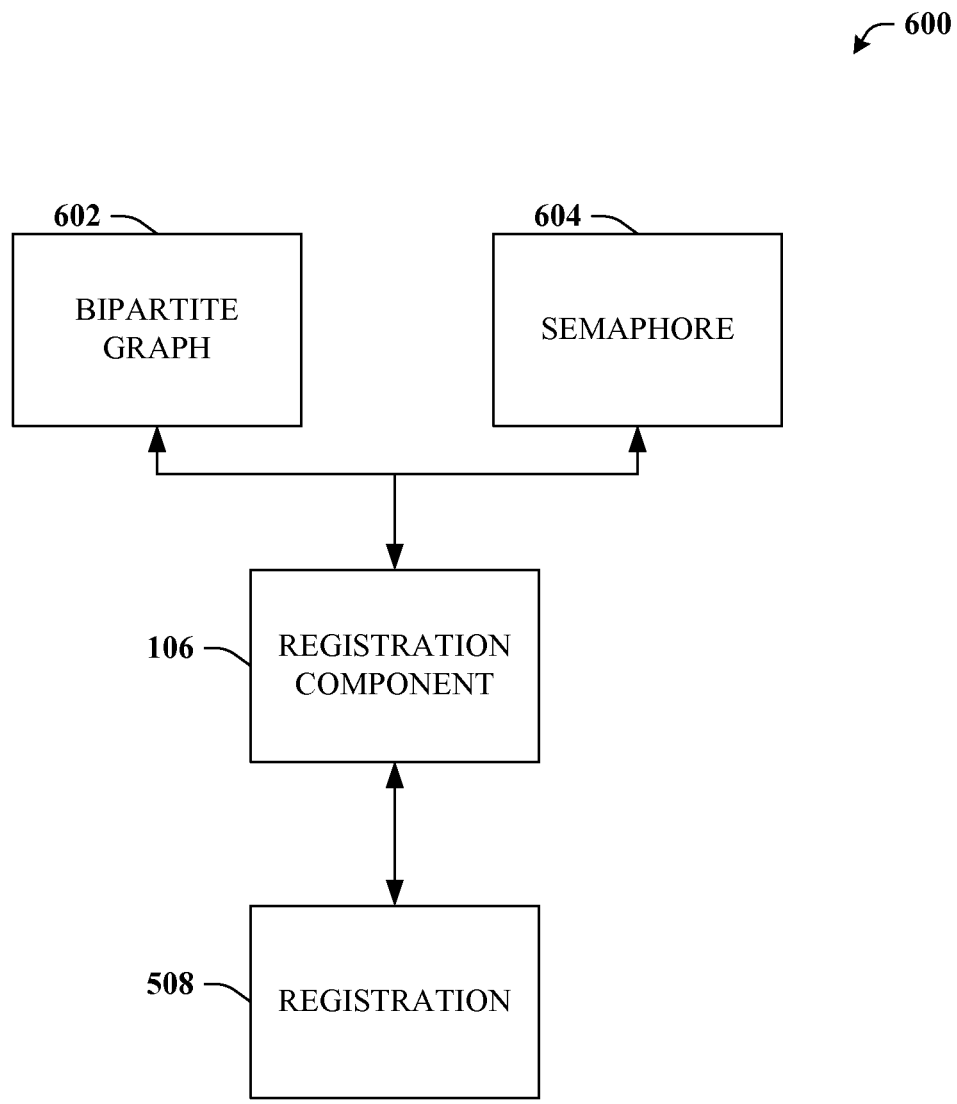
FIG. 6 illustrates a block diagram of a computer-implemented system that can employ various schemes in order to resolve concurrency.

With reference still to FIG. 5, but turning now to FIG. 6, a system 600 that can employ various schemes in order to resolve concurrency is illustrated. Generally, the registration component 106 is configured to create at most one registration 508 for any given proxy, irrespective of the number of registration requests it receives involving that proxy. In conventional systems (e.g., auction systems), which do not resolve concurrency, both buyers and sellers must be very careful about making multiple offers since more than one might be accepted. Moreover, in conventional systems, accepted offers typically become immediately binding since most systems do not allow an offer, once made, to be withdrawn. These and other difficulties of conventional systems virtually preclude simultaneous negotiations between multiple parties unless the seller/buyer is willing to accept the consequences of being obligated to sell/buy more than one item.

In contrast, and in accordance with one aspect of the claimed subject matter, these difficulties can be mitigated. As mentioned supra, the registration component 106 can create a registration 508 for at most one request. To the accomplishment of the foregoing and other related ends, the registration component 106 can employ at least one of a bipartite graph 602 and a semaphore 604. Semaphore(s) 604 can be a protected variable (or abstract data type) and can constitute the classic well-known method for restricting access to equivalent shared resources (e.g., storage) in a multiprogramming environment, and will be discussed in more detail with reference to FIG. 10. Bipartite graph 602 can be a special graph known in the mathematical field of graph theory, where the sets of vertices can be divided into two disjoint sets U and V such that every edge can have at most one end-point in U and one end-point in V. Bipartite graph 602 can be further detailed with reference to FIG. 7.

Figure 7:
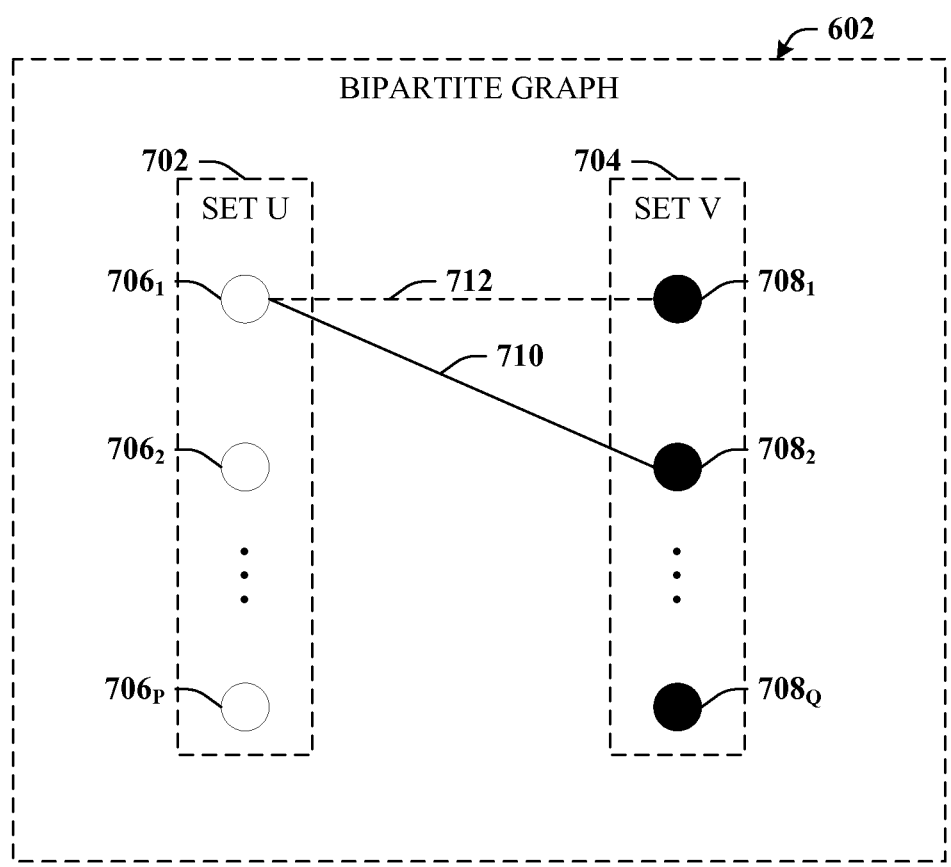
FIG. 7 depicts a block diagram of an exemplary computer-implemented bipartite graph employed for resolving concurrency.

Turning briefly to FIG. 7 (while still referencing FIG. 5), an exemplary bipartite graph 602 employed for resolving concurrency is depicted. The bipartite graph 602 can include a set U 702 and a set V 704, wherein the sets 702-704 are disjoint (e.g., they have no elements or members in common). The members of set U 702 can be vertices $706_1$-$706_P$ (referred to herein either individually or collectively as vertices 706) comprising, e.g., only seller proxies. Similarly the members of set V 704 can be $708_1$-$708_Q$ (referred to herein either individually or collectively as vertices 708) comprised of, e.g., only buyer proxies. Accordingly, all vertices 706 and 708 can have at most one edge (e.g., edge 710) and any edge must connect a seller (e.g., a vertex 706 from set U 702) to a buyer (e.g., a vertex 708 from set V 708). Thus, typically, the vertices 706 and 708 can be color coded (here vertices 706 are white and vertices 708 are black) such that an edge can only exist between one white vertex 706 and one black vertex 708.

When a registration request arrives, the registration component 106 can effectuate the registration 508 by creating an edge 710 between the associated proxies (e.g., an edge between the vertex associated with the proxy that submitted the registration request and the vertex associated with the proxy from which the proposal was accepted). It is to be appreciated that if an edge 710 already exists for either associated vertex (e.g., vertices $706_1$ and $708_2$), then an edge such as edge 712 cannot be created. This situation illustrates a successful registration 508 of one registration request (e.g., edge 710), with an unsuccessful registration request (e.g., edge 712). Only the registration request associated with edge 710 need become binding and other concurrent registration requests need not. Once a binding registration 508 occurs, the proxies associated with the registration 508 can be terminated.

Figure 8:
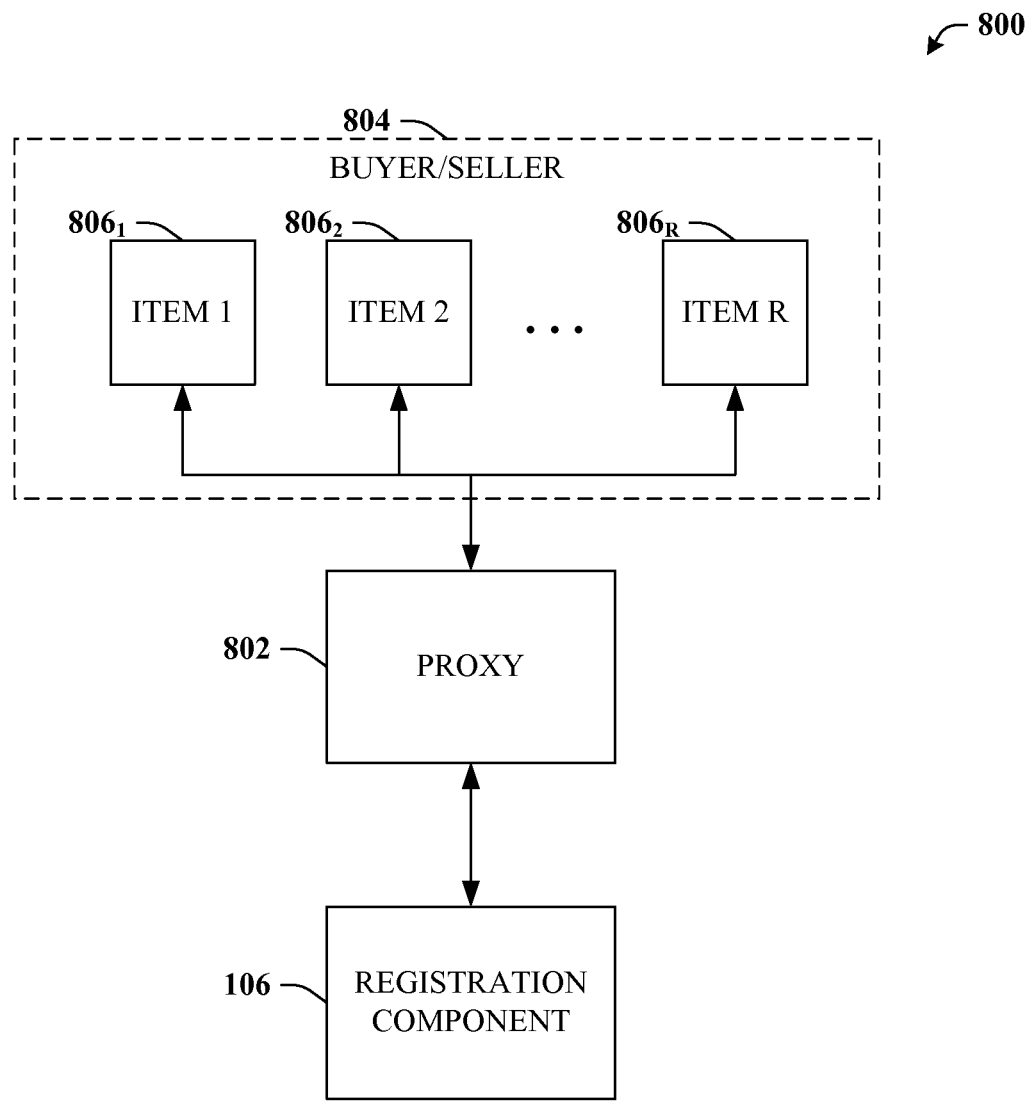
FIG. 8 illustrates an exemplary computer-implemented system that can negotiate transaction for multiple items.

Referring simultaneously to FIGS. 7 and 8, FIG. 8 depicts a system 800 that can negotiate transaction for multiple items. As described above, a proxy 802 can be configured by a buyer/seller 804 to buy/sell more than one item $806_1$-$806_R$ (referred to herein either individually or collectively as items 806). For example, the quantity 222 or 322 features (from FIGS. 2 and 3) can be adjusted from one to any positive integer such as R. Typically, the proxy 802 will only end negotiations when the quantity goes to zero (e.g., following successful registrations by the registration component 106). To the accomplishment of the foregoing, the bipartite graph 602 can be configured such that each set of vertices 702 and 704 corresponds to an item 806 of the proxy 802 rather than to the proxy 802 itself More specifically, if the proxy 802 is a sell proxy for a seller 804, then each item 806 can be a vertex 706. Likewise if the proxy 802 is a buyer proxy for a buyer 804, then each item 806 can be a vertex 708. The registration component 106 can resolve concurrency in the manner previously described, but now extended to multiple items 806.

Figure 9:
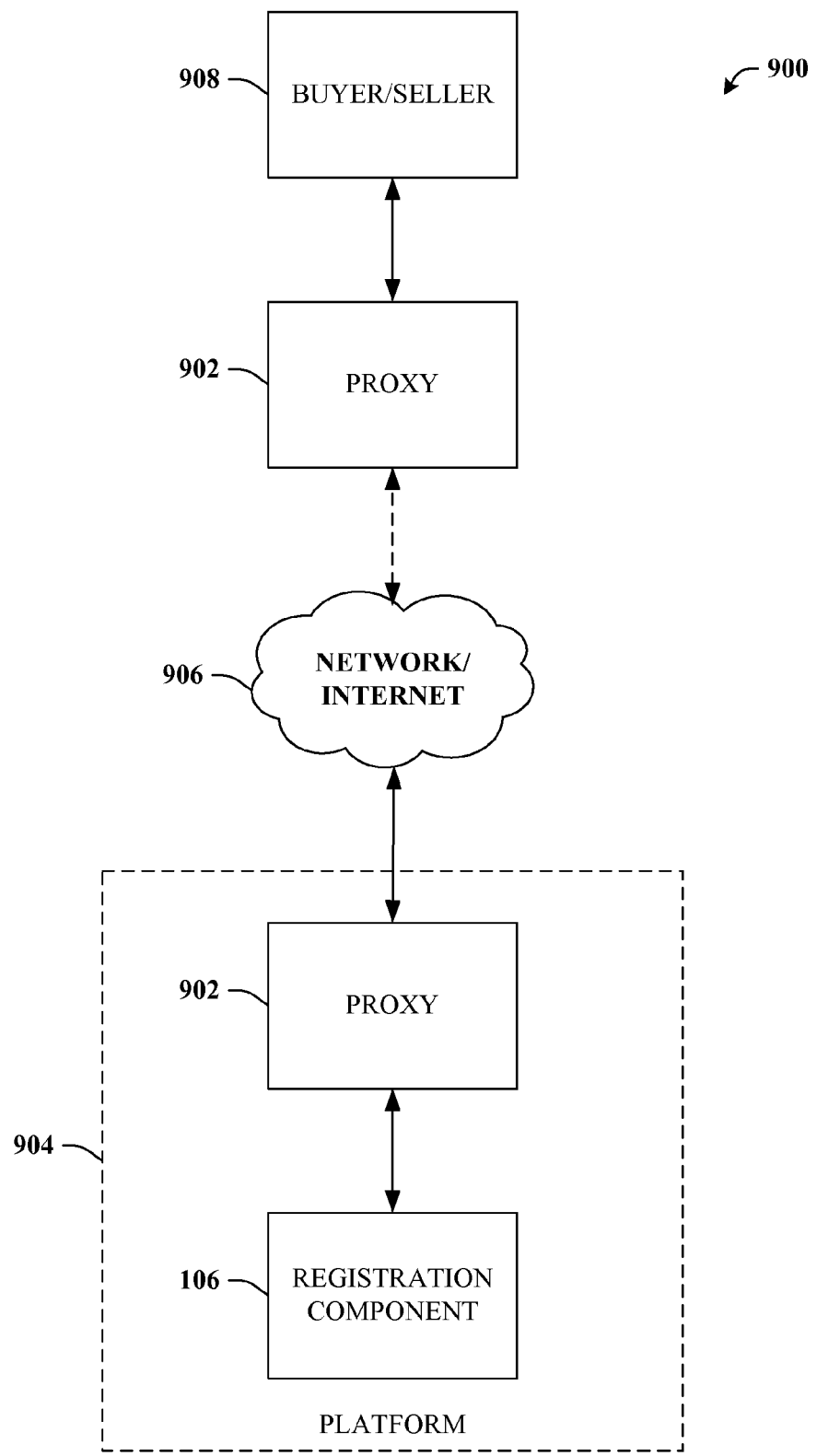
FIG. 9 is a computer-implemented system that can manage negotiations offline.

With reference now to FIG. 9, a system 900 that can manage negotiations offline is depicted. Generally, the system 900 can include a proxy 902 that can be, e.g., either a buyer proxy or a seller proxy such as those detailed herein. The proxy 902 can negotiate with other proxies (not shown) and send successful negotiation proposals to the registration component 106 in the form of registration requests. Typically, the proxy 902 and the registration component 106 can reside on a platform 904 of a platform owner (not shown).

The platform 904 can be operatively coupled to a network 906 (e.g., the Internet) to allow for remote access by a buyer/seller 908 associated with the proxy 902. In addition, the proxy 902 (or copy thereof with well-known synchronizing protocols embedded) can reside on a device (not shown) on the buyer/seller 908 end. Accordingly, negations can be facilitated without a persistent connection to the network 906. For example, the buyer/seller 908 could update a proposal, briefly connect to the network 906 to send or receive updated information, and then go offline once more. Thereafter, the information available on the platform can be employed to effectuate the negotiations described herein. The platform 904 can be a single computer with a single processor, a single computer or server with multiple processors, and/or a plurality of servers as detailed more thoroughly in connection with FIG. 10.

Figure 10:
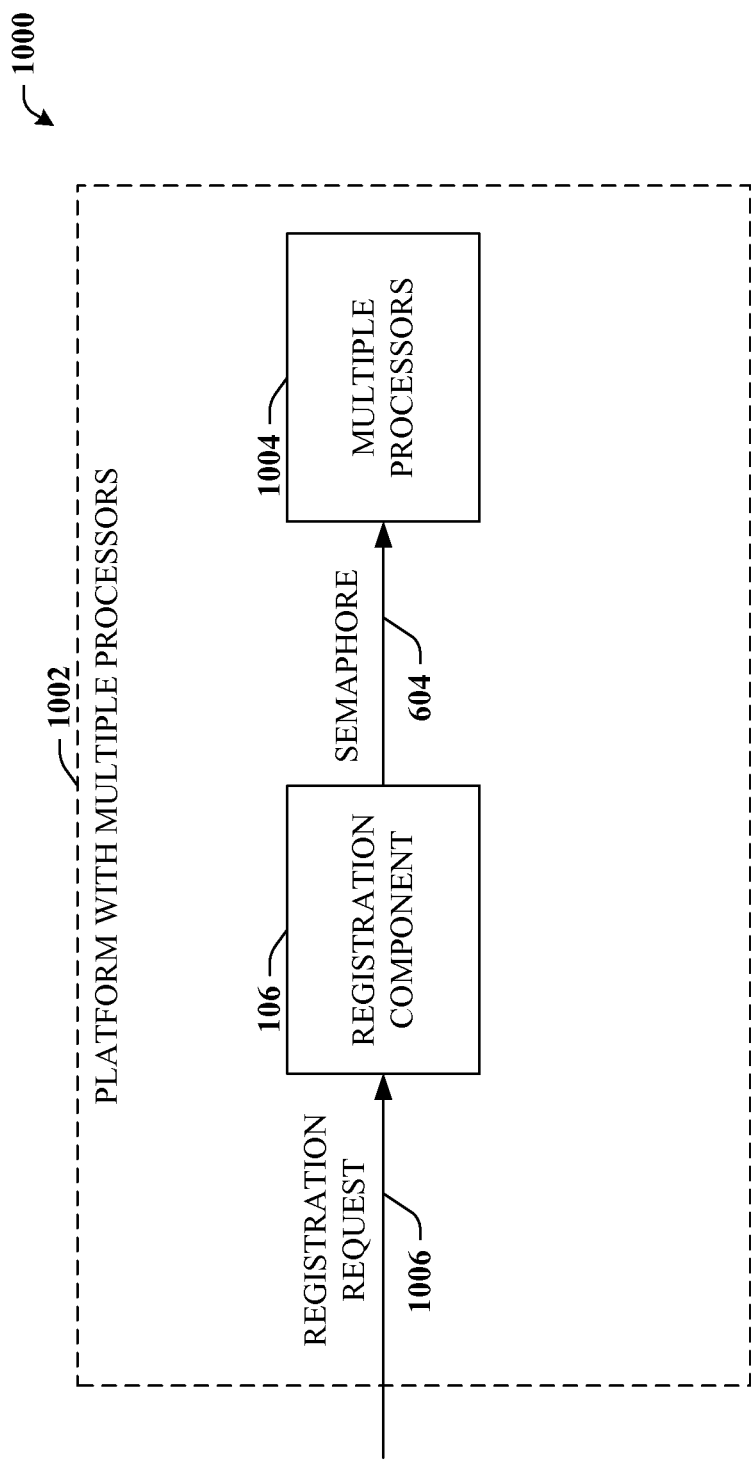
FIG. 10 illustrates a block diagram of a computer-implemented system that can resolve concurrency on a platform with multiple processors.

With reference now to FIG. 10, a system 1000 that can resolve concurrency on a platform 1002 with multiple processors 1004 is illustrated. As described with reference to FIG. 6, the registration component 106 has at its disposal a variety of tools for resolving concurrency such as the bipartite graph 602 and the semaphore 604. In an environment in which there is only a single processor, typically a bipartite graph will be sufficient for the registration component 106 to resolve concurrency. In other cases, as here, where the platform 1002 has multiple processors 1004 there is a possibility that parallel processing could result in the registration component 106 registering two registration requests 1006 due to processes running on different ones of the multiple processors 1004. In order to mitigate this result the registration component can employ the semaphore 604. Typically, the value of a semaphore (e.g., semaphore 604) is initialized to the number of equivalent shared resources it is implemented to control.

Figure 11:
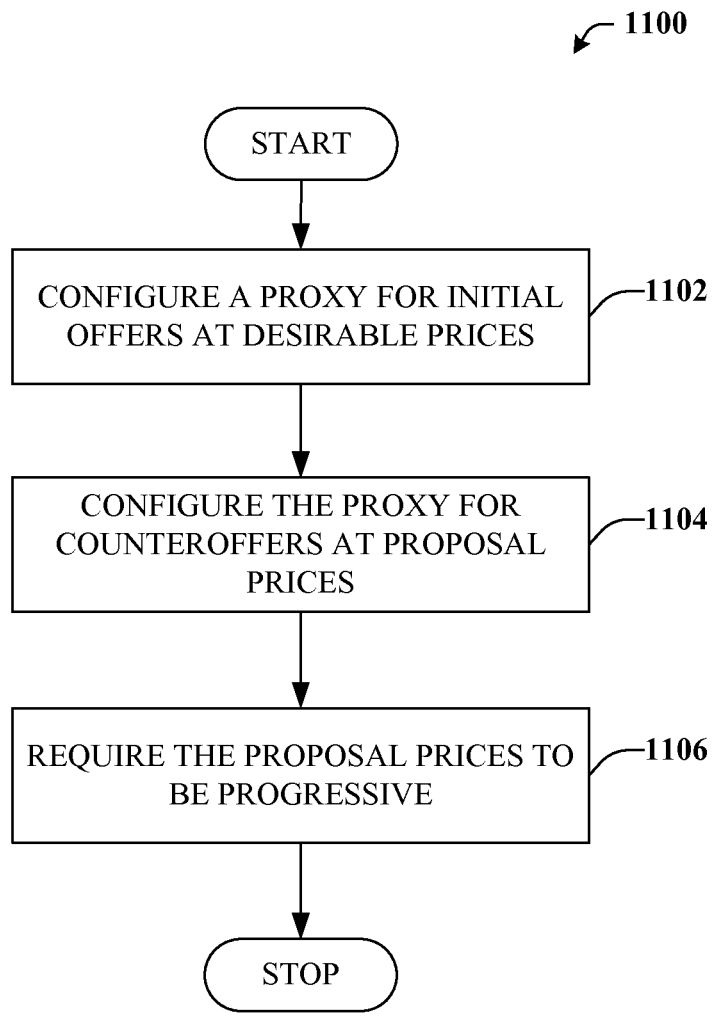
FIG. 11 is an exemplary flow chart of procedures for ensuring that negotiations for sale of an item are meaningful.
Figure 12:
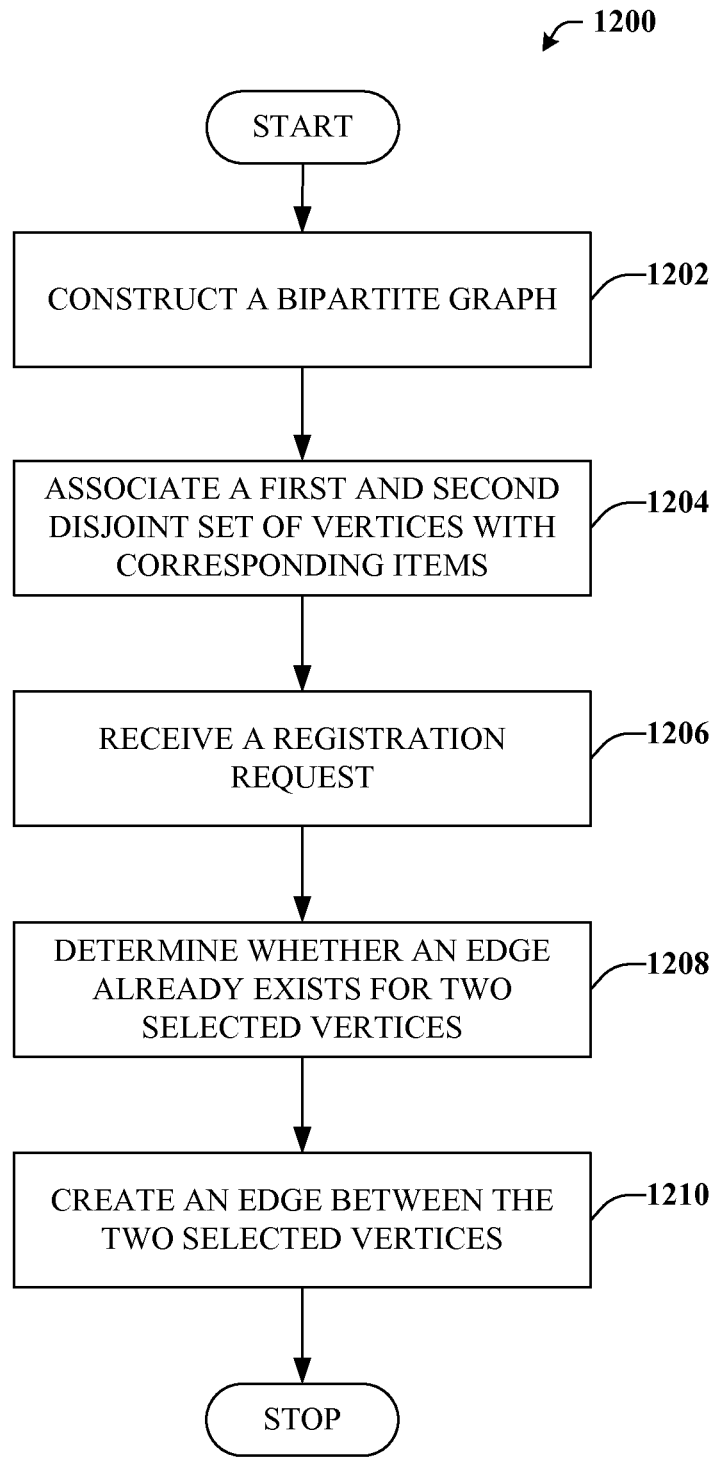
FIG. 12 depicts an exemplary flow chart of procedures for ensuring that at most one item is sold and/or at most only a single item is bought for a particular proxy.

Generally, the semaphore 604 can be employed to lock and/or unlock a resource such that no other process can access and/or modify the resource until it is unlocked. In this case, the resource could be the bipartite graph 602 or vertices 706-708 thereof detailed in connection with FIG. 7. In this manner, at most only one of the multiple processors can create an edge between the vertices locked by the semaphore 604. It is to be appreciated that the registration request 1006 can be sent by a component included in the platform 1002 as well as by a component remote from the platform 1002 (such as the cases described in connection with FIG. 9), FIGS. 11 and 12 illustrate process flow diagrams of computer-implemented methods. While, for purposes of simplicity of explanation, the one or more methods shown herein, e.g., in the form of a flow chart, are shown and described as a series of acts, it is to be understood and appreciated that the subject invention is not limited by the order of acts, as some acts may, in accordance with the claimed subject matter, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Referring now to FIG. 11, an exemplary flow chart of procedures defining a method 1100 for ensuring that negotiations for sale of an item are meaningful is illustrated. Generally, at 1102, a proxy can be configured for transmitting and receiving initial offers for an item at desirable prices. In accordance with one aspect of the claimed subject matter, the proxy can be one of a buyer proxy and a seller proxy and, depending upon this distinction the desirable prices can be either a desirable sell price or a desirable buy price. Thus, the initial offers can be at prices represented by the desirable prices.

At 1104, the proxy can be configured for transmitting and receiving counteroffers for the item at proposal prices. Typically, the proposal prices fall between a price gap calculated as the difference between the prices of two initial offers. Finally, at 1106, the proposal prices can be required to be progressive based upon a percentage (e.g., 25%) of the price gap between one of the desirable prices and one of the proposal prices. It is to be appreciated that for the purposes of the progressive proposals the initial buyer offer begins with a price gap equal to the desirable sell price.

It is also to be appreciated and understood that the percentage can be figures other than 25%. Moreover, this percentage can be fixed globally and/or dynamically updated based upon a variety of factors about which certain inferences can be made. In addition, it is also to be understood that the item can be substantially anything that can be negotiated for and or sold by way of an online market such as, for example, virtually any product or service.

Turning now to FIG. 12, an exemplary flow chart of procedures defining a method 1200 for ensuring that at most one item is sold and/or at most only a single item is bought for a particular proxy is depicted. At 1202, a bipartite graph can be constructed. Normally, the bipartite graph will have two sets of disjoint vertices in which any given vertex can have at most one edge and any edge must connect to a vertex from a different set. At 1204, a first disjoint set of vertices can be associated with items for sale and a second disjoint set of vertices can be associated with items for purchase.

At 1206, a registration request associated with one of the vertices of the first set (a first vertex), or one of the vertices of the second set (a second vertex) can be received. For example, as detailed supra, each vertex can be associated with an item being negotiated by a proxy. When one of the proxies accepts an offer/proposal from another proxy, the accepting proxy can deliver the registration request. It is to be appreciated that the registration request implicate both of the proxies associated with the successful negotiations and that the registration request can be delivered to a platform either locally of from a remote location.

At 1208, a determination can be made as to whether an edge already exists for either one of the first or second vertex. If so, the registration will generally fail because if an edge already exists, then a binding agreement has already been achieved for at least one of the buyer and the seller associated with one of the vertices involved in the registration request (e.g., the seller has already sold the item or the buyer has purchased a different item in lieu of the seller's item). At 1210, an edge can be created between the first vertex and the second vertex. When an edge is completed, it can be presumed that the registration request was successful and that contractual obligations arise for both of the buyer and the seller.

Figure 13:
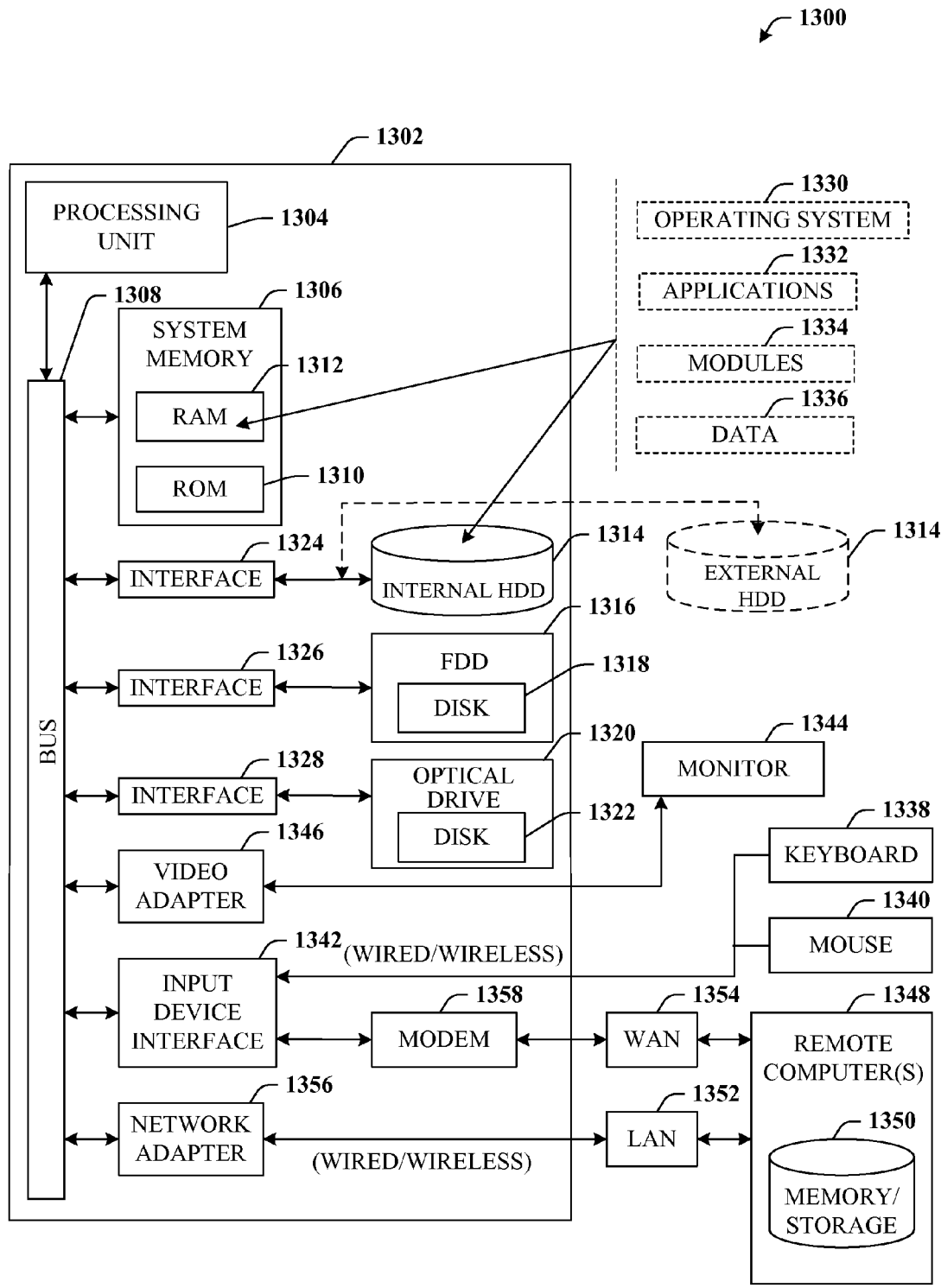
FIG. 13 illustrates a block diagram of a computer operable to execute the disclosed architecture.

Referring now to FIG. 13, there is illustrated a block diagram of an exemplary computer system operable to execute the disclosed architecture. In order to provide additional context for various aspects of the claimed subject matter, FIG. 13 and the following discussion are intended to provide a brief, general description of a suitable computing environment 1300 in which the various aspects of the claimed subject matter can be implemented. For example, various components of the systems and/or aspects thereof described supra can be implemented by way of the system 1300. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the claimed subject matter includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the claimed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 14:
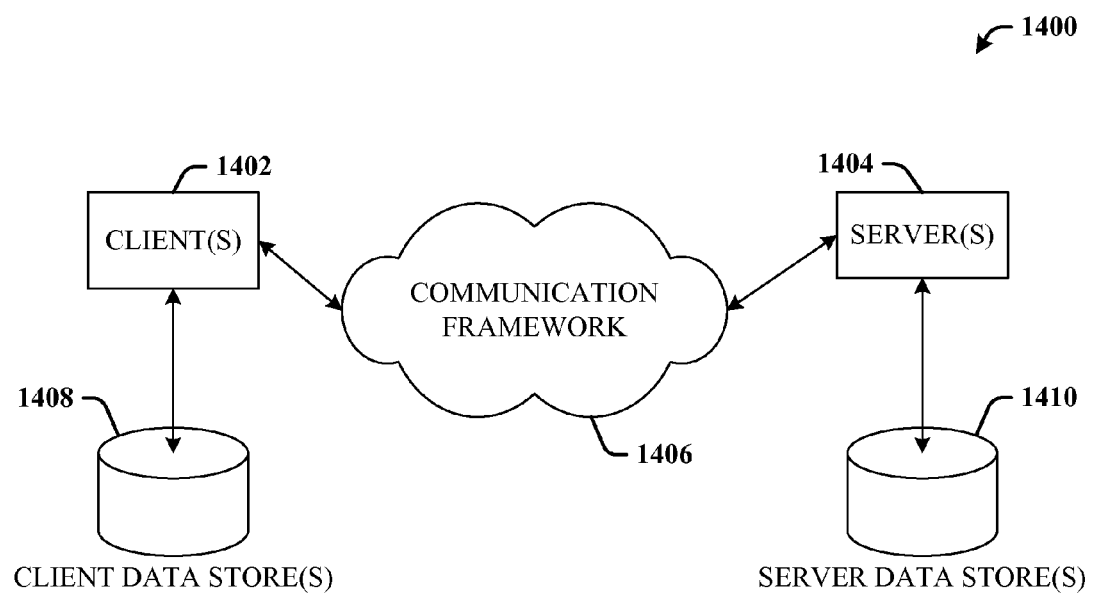
FIG. 14 illustrates a schematic block diagram of an exemplary computing environment.

Referring now to FIG. 14, there is illustrated a schematic block diagram of an exemplary computer compilation system operable to execute the disclosed architecture. The system 1400 includes one or more client(s) 1402. The client(s) 1402 can be hardware such as a digital camera with computer interface support and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the terms "includes" or "include" are used in either the detailed description or the claims, such terms are intended to be inclusive in a manner similar to the term "comprising" as "comprising" is interpreted when employed as a transitional word in a claim.

What is claimed is:

1. A computer-implemented system comprising the following computer components stored in a computer storage media and executable by one or more processors:
    a plurality of seller proxies configured to negotiate offers to sell a plurality of similar items for respective sellers at respective proposed sell prices;
    a buyer proxy configured to negotiate an offer to purchase at least one of the plurality of similar items for a buyer at a proposed buy price; and
    a registration component configured to:
        receive one or more registration requests from:
            i) a seller proxy when a seller accepts the offer to purchase at the proposed buy price; or
            ii) the buyer proxy when the buyer accepts an offer to sell at a proposed sell price;
        initiate one or more registrations after receiving the one or more registration requests, wherein each registration creates a binding agreement between the buyer and a seller; and
        resolve concurrency ensuring that the buyer does not purchase more than a pre-set quantity of similar items by terminating outstanding offers to purchase after the pre-set quantity has been satisfied.

2. The computer-implemented system of claim 1, wherein the proposed buy price is an initial proposed buy price, and the buyer proxy is further configured to provide a progressive counteroffer buy price responsive to receiving one or more of the respective proposed sell prices that fail to satisfy the initial proposed buy price.

3. The computer-implemented system of claim 2, wherein the progressive counteroffer buy price is applied to negotiations with each of the plurality of seller proxies.

4. The computer-implemented system of claim 2, wherein the progressive counteroffer buy price is applied to negotiations with a particular one of the plurality of seller proxies.

5. The computer-implemented system of claim 2, wherein the progressive counteroffer buy price is required to close at least a fixed percentage of a price gap between the initial proposed buy price and a particular one of the respective proposed sell prices.

6. The computer-implemented system of claim 1, wherein the proposed buy price is configured to be valid for a pre-defined period of time.

7. The computer-implemented system of claim 1, wherein each of the respective proposed sell prices are configured to be valid for a pre-defined period of time.

8. A computer-implemented system of claim 1, wherein the pre-set quantity is one.

9. The computer-implemented system of claim 1, wherein the pre-set quantity is more than one.

10. The computer-implemented system of claim 9, wherein the pre-set quantity is reduced if a total aggregate purchase is realized.

11. A method comprising:
negotiating, for each of a plurality of computer seller proxies, a sale offer of a plurality of similar items for respective sellers at respective proposed sell prices;
negotiating, via a computer buyer proxy, a purchase offer of at least one of the plurality of similar items for a buyer at a proposed buy price;
receiving, at any time during the negotiations, a registration request from:
 i) a computer seller proxy when a seller accepts the purchase offer at the proposed buy price; or
 ii) the computer buyer proxy when the buyer accepts one of the sale offers at a proposed sell price;
initiating a registration after receiving the registration request, the registration creating a binding agreement between the buyer and a seller; and
subsequent to initiating the registration, resolving concurrency ensuring that the buyer does not purchase more than a pre-set quantity of the plurality of similar items by terminating outstanding offers to purchase after the pre-set quantity has been satisfied.

12. The method of claim 11, wherein the proposed buy price is an initial proposed buy price, the method further comprising providing a progressive counteroffer buy price responsive to receiving one or more of the respective proposed sell prices that fail to satisfy the initial proposed buy price.

13. The method of claim 12, wherein the progressive counteroffer buy price is required to close at least a fixed percentage of a price gap between the initial proposed buy price and a particular one of the respective proposed sell prices.

14. The method of claim 11, wherein the proposed buy price is configured to be valid for a pre-defined period of time.

15. The method of claim 11, wherein each of the respective proposed sell prices are configured to be valid for a pre-defined period of time.

16. The method of claim 11, wherein the pre-set quantity is one.

17. The method of claim 11, wherein the pre-set quantity is more than one.

18. The method of claim 11, wherein the pre-set quantity is reduced if a total aggregate purchase amount is realized.

19. A method comprising:
receiving, from each of a plurality of computer seller proxies during a negotiation, an offer to sell an item at a proposed sell price, wherein the offer to sell can be withdrawn by the computer seller proxy prior to registration of a binding agreement;
receiving, from a computer buyer proxy during the negotiation, one or more offers to purchase the item at a proposed purchase price, wherein each offer to purchase can be withdrawn by the computer buyer proxy prior to registration of a binding agreement;
receiving, during the negotiation, one or more registration requests from:
 i) a computer seller proxy when a seller accepts the offer to purchase the item at the proposed purchase price; or
 ii) the computer buyer proxy when a buyer accepts one of the offers to sell the item at the proposed sell price;
registering a binding agreement for each of the one or more registration requests; and
resolving concurrency ensuring that the computer buyer proxy does not exceed purchasing a pre-set quantity of the items by terminating outstanding offers to purchase after the pre-set quantity has been satisfied.

20. The method of claim 19, wherein the items being sold by the plurality of computer seller proxies are similar.

* * * * *